United States Patent
Price et al.

(10) Patent No.: US 6,672,280 B2
(45) Date of Patent: Jan. 6, 2004

(54) TORSION SPRING ASSEMBLY FOR ELECTRONIC THROTTLE

(75) Inventors: Gene C. Price, Washington, MI (US); James R. Rauch, Grass Lake, MI (US); Fred Barnes, Howell, MI (US); Scott A. Sapp, Westland, MI (US); Thomas R. Goodhue, Ypsilanti, MI (US); Walter E. Root, II, Ypsilanti, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/803,159

(22) Filed: Mar. 9, 2001

(65) Prior Publication Data

US 2002/0125456 A1 Sep. 12, 2002

(51) Int. Cl.$^7$ ................................................. F02D 9/10
(52) U.S. Cl. ...................... 123/337; 123/399; 251/337; 251/129.11
(58) Field of Search ........................... 123/337, 339.15, 123/339.25, 339.26, 397, 399; 251/305, 336, 337, 129.11, 129.12

(56) References Cited

U.S. PATENT DOCUMENTS

| | | | |
|---|---|---|---|
| 3,761,854 A | 9/1973 | Kubiak et al. | |
| RE30,135 E * | 11/1979 | Fizwater et al. | 74/2 |
| 4,535,820 A | 8/1985 | Raines | |
| 4,828,235 A | 5/1989 | Paggeot | 267/155 |
| 5,368,283 A * | 11/1994 | Pavlin | 267/155 |
| 5,378,039 A | 1/1995 | Lie | |
| 5,399,115 A | 3/1995 | Arad et al. | |
| 5,403,069 A | 4/1995 | Inara et al. | |
| 5,509,396 A | 4/1996 | Tamaki | 123/400 |
| 5,525,086 A | 6/1996 | Gentile et al. | |
| 5,685,521 A | 11/1997 | Yoshida et al. | 251/313 |
| 5,762,044 A | 6/1998 | Hollister et al. | 123/400 |
| 5,878,715 A * | 3/1999 | Hernandez et al. | 123/184.61 |
| 5,897,565 A | 4/1999 | Foster | 606/158 |
| 5,986,368 A | 11/1999 | Wetzel et al. | |
| 6,032,766 A | 3/2000 | Yang | |
| 6,070,852 A * | 6/2000 | McDonnell et al. | 123/396 |
| 6,079,210 A | 6/2000 | Pintauro et al. | |
| 6,145,797 A | 11/2000 | Uehara | |
| 6,189,376 B1 | 2/2001 | Shock et al. | |
| 6,364,287 B1 * | 4/2002 | Rauch et al. | 137/315.22 |
| 6,375,151 B1 * | 4/2002 | Vanderveen et al. | 123/339.13 |
| 6,386,178 B1 * | 5/2002 | Rauch | 123/337 |
| 6,390,062 B1 * | 5/2002 | Saito et al. | 123/399 |

FOREIGN PATENT DOCUMENTS

| | | |
|---|---|---|
| EP | 1 024 268 A2 | 8/2000 |
| EP | 1 024 271 A2 | 8/2000 |
| EP | 1 024 268 A3 | 12/2000 |
| EP | 1 024 271 A3 | 12/2000 |
| EP | 1 099 840 A2 | 5/2001 |
| EP | 1 099 842 A2 | 5/2001 |
| EP | 1 179 665 A2 | 2/2002 |
| EP | 1 191 210 A1 | 3/2002 |
| EP | 1 099 840 A3 | 4/2002 |
| EP | 1 099 842 A3 | 4/2002 |
| EP | 1 179 665 A3 | 5/2002 |
| JP | 2001-227362 A | 8/2001 |

* cited by examiner

Primary Examiner—Gene Mancene
Assistant Examiner—Arnold Castro
(74) Attorney, Agent, or Firm—Brinks Hofer Gilson & Lione (57) ABSTRACT

An electronic throttle body uses a spring and an insert to generate a force tending to oppose the motion of opening a throttle. The insert locates and centers the coils of the spring and also acts during assembly to place the proper amount of torsion on the spring and the throttle body system. Once a throttle body motor or other force ceases to exert force against the spring, the spring causes the throttle to close.

7 Claims, 9 Drawing Sheets

TORSION SPRING ASSEMBLY FOR ELECTRONIC THROTTLE

BACKGROUND OF THE INVENTION

Internal combustion engines used in automobiles typically operate on fuel-air mixtures, where a fuel injector supplies fuel and a throttle supplies air. On-board computers, programmed to be responsive to a signal from an accelerator in the automobile, determine the amounts of fuel and air. When a driver wishes to go faster, he or she depresses the accelerator, signaling the computer to supply more fuel and more air to the engine. The fuel injectors respond by supplying more fuel and the throttle responds by opening wider to admit more air to the cylinders of the engine. When the driver wishes to slow down, the driver lifts his or her foot from the accelerator, signaling the fuel injectors to supply less fuel and the throttle to move to a more closed position.

The throttle is typically an air valve, in which a butterfly valve on a shaft controls the flow of air. A gear train to a motor responsive to the on-board computer controls the shaft rotation, and thus the butterfly valve position. When the computer calls for more air, the shaft rotates in one direction to open the valve. When less air is needed, the shaft rotates in the opposite direction to close the valve. If the motor fails, the air valve or throttle must move to a safe condition. That is, the motorist wants any failure in the air valve train to be in fail "safe" or closed condition, ceasing operation of the engine, rather than failing in an "open" position, which could lead to uncontrolled operation.

A spring wound onto the shaft during assembly of the throttle enables automatic closing of the throttle. When the shaft rotates to admit more air, it winds the spring and puts it into a state of torsion, in which the force or bias of the spring opposes the rotation of the shaft in that direction. If the motor fails, the spring biases the shaft in the opposite direction, closing the valve. During manufacture and assembly of the throttle, however, it is difficult to wind the spring, assemble it onto the shaft, and apply the proper amount of torsion for the desired operation. The present invention is directed to improvements in a torsion spring assembly, and particularly improvements to a torsion spring assembly used in an electronic throttle for automotive applications.

BRIEF SUMMARY OF THE INVENTION

The present invention provides a unique insert used for winding the spring and assembling it onto a shaft of a throttle. One aspect of the invention is a torsion spring assembly. The torsion spring assembly may be used to move a throttle to a closed position. In one embodiment, the assembly preferably includes a helically wound spring having a plurality of coils, including a first coil and a last coil, the first and the last coils each having an end portion, or tang. The tangs may be bent at an angle to the body of the coils, such as a right angle, or they may extend radially or tangentially from the spring. One end of an insert is placed inside the spring to support and center the spring. This end of the insert has an aperture or hole for receiving one of the end portions of the spring, thus preventing the spring from free rotation. The other end of the insert has at least two slots and at least one tab.

In one embodiment, the torsion spring assembly includes a housing, the housing having slots to match the tabs of the insert when they are assembled together. The assembly also includes a load element, to be assembled concentric with the insert, with the load element having an aperture or hole for receiving the other end portion or tang of the spring. These parts are then preferably assembled with a winding tool. An assembler uses the winding tool to rotate the insert a specific angle so its tabs mate with slots in the housing. In one embodiment, the insert also centers the spring and prevents any unwanted motion. Winding the spring puts it into a state of torsion. After winding, the tabs of the insert mate with slots in the housing, and the torsion spring assembly includes the spring, the insert, and the load element on one side of the housing. A cap on the other side helps lock the insert into place and seals the spring from the external environment.

In other embodiments, other parts may be added in order to furnish a throttle assembly, including a motor and a gear train on the housing, and a gear or gear sector on the load element. A shaft with a valve, such as a butterfly valve, may be assembled concentric with the spring and the insert, the butterfly valve being part of a throttle with a throttle body. The motor is used to rotate the shaft, thus opening or closing the valve through the gear train. The throttle may also include a position sensor for feeding back position information to an on-board computer.

Another aspect of the invention is a method of moving a throttle to a closed position. In one embodiment, the method includes providing an electronic throttle, the throttle assembled with a return spring and an insert, the insert acting to center and support the spring, and when the throttle is assembled, the spring is put into torsion. The method preferably further includes opening the throttle and further torsioning the spring by opening the throttle, and the spring is held in torsion by the assembly. The method then includes closing the throttle by the torsion of the spring when a force holding the throttle open is released, and the spring causes the throttle to move in the opposite direction, closing the throttle.

DETAILED DESCRIPTION OF THE INVENTION

The invention makes easier the assembly of a torsion spring assembly, such as a torsion spring assembly used in an electronic throttle. The purpose of the torsion spring assembly is to close the butterfly valve if the motor does not close the valve upon command. The command may come from an on-board computer or other source, such as an analog or digital controller. In an internal combustion engine, it is preferred, and mandated by the Federal Motor Vehicle Safety Standards (FMVSS), for throttles to fail in a safe or closed condition, eliminating any possibility of runaway engines. For this reason, electronic throttles are equipped with torsion spring assemblies. If the motor fails, and no other force acts upon the shaft that actuates the throttle, the opposing torsion of the spring will close the throttle.

To accomplish this, a spring is wound around the shaft, preloading the spring with a small amount of torsion in a direction opposed to the motion that opens the valve. When the throttle is actuated and the motor causes the valve to open and the shaft to rotate, more torsional force is placed on the spring. However, it is very difficult to both wind the spring and pre-load it upon the shaft. If the spring is wound and then assembled onto the shaft, it is necessary to provide a pre-load or small torsional force during assembly. The insert, and its tabs, fitting into matching slots of the housing or motor cover, allow the design and manufacture of a torsion spring with a known and fixed amount of preload and torsion.

Figure 1:
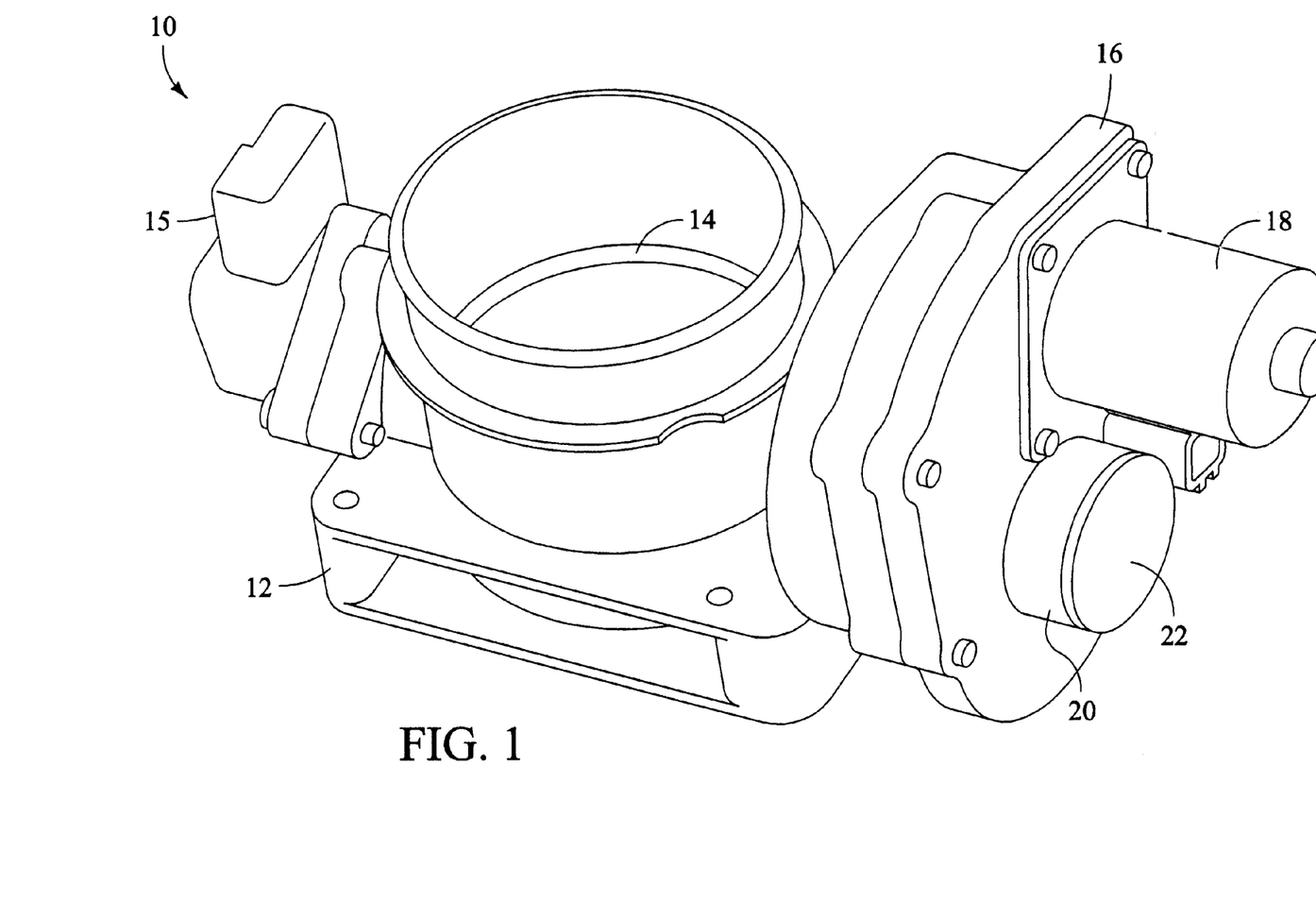
FIG. 1 is a perspective view of an electronic throttle utilizing a torsion spring assembly.
Figure 2:
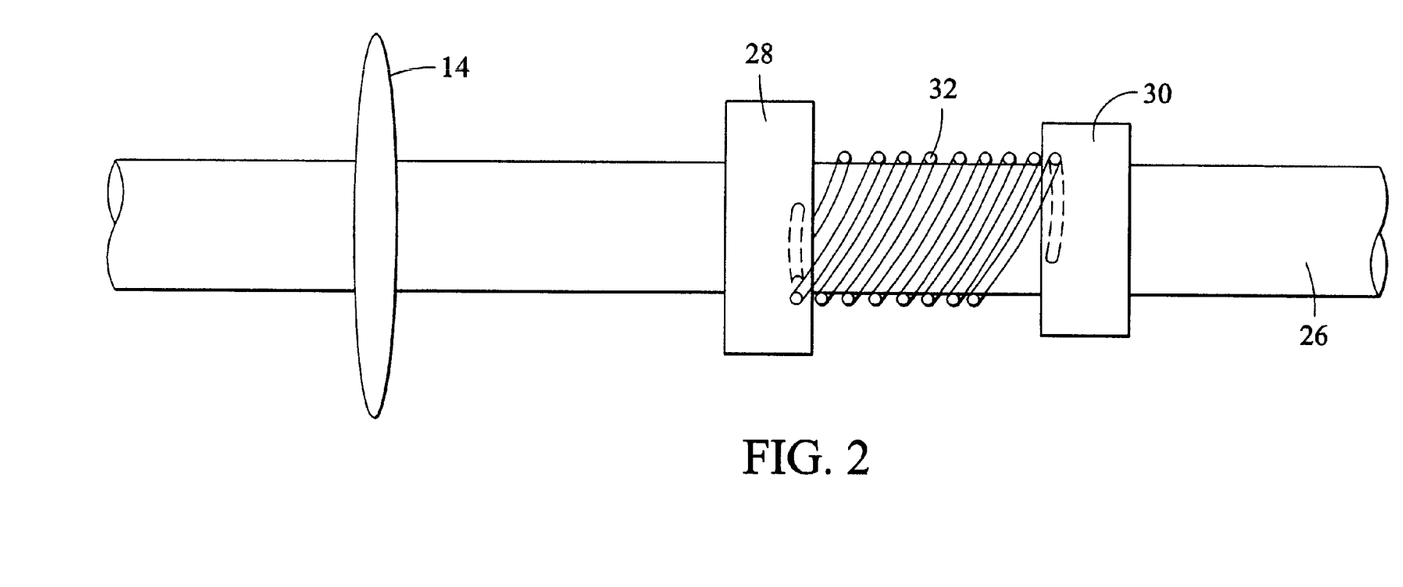
FIG. 2 is an exploded view of a torsion spring assembly on a shaft.

FIG. 1 is a throttle such as an electronic throttle used for an air intake for an internal combustion engine. Electronic throttle 10 includes a throttle housing 12, a butterfly valve 14, and valve position sensor 15. Controls for the throttle may include a motor cover 16, a motor 18, a pocket 20 on the motor cover for a return spring and cap 22. In operation, the motor receives a signal from a controller (not shown) to open the throttle. The motor turns, and causes a gear train (not shown) to turn a shaft to which the butterfly valve is attached. The motor cover preferably provides a mount for the motor, the gear train, and other parts for the throttle, including a torsion spring assembly that provides a force on the shaft counter-balancing the torque provided by the motor through the gear train. FIG. 2 is an exploded view of a torsion spring assembly for a throttle valve. Butterfly valve 14 is turned by shaft 26 through gear 28 that is also mounted to the shaft and provides the interface to the gear train. The gear may be mounted by any convenient means, including machining the gear as an integral part of the shaft, such as a shaft having a gear splined thereupon. The gear may also be molded separately and mounted on the shaft, or the gear may be molded directly onto the shaft by compression or injection molding, or other convenient process. In one embodiment, an insert 30 is also part of the torsion spring assembly, the insert acting in concert with a torsion spring 32.

Figure 3:
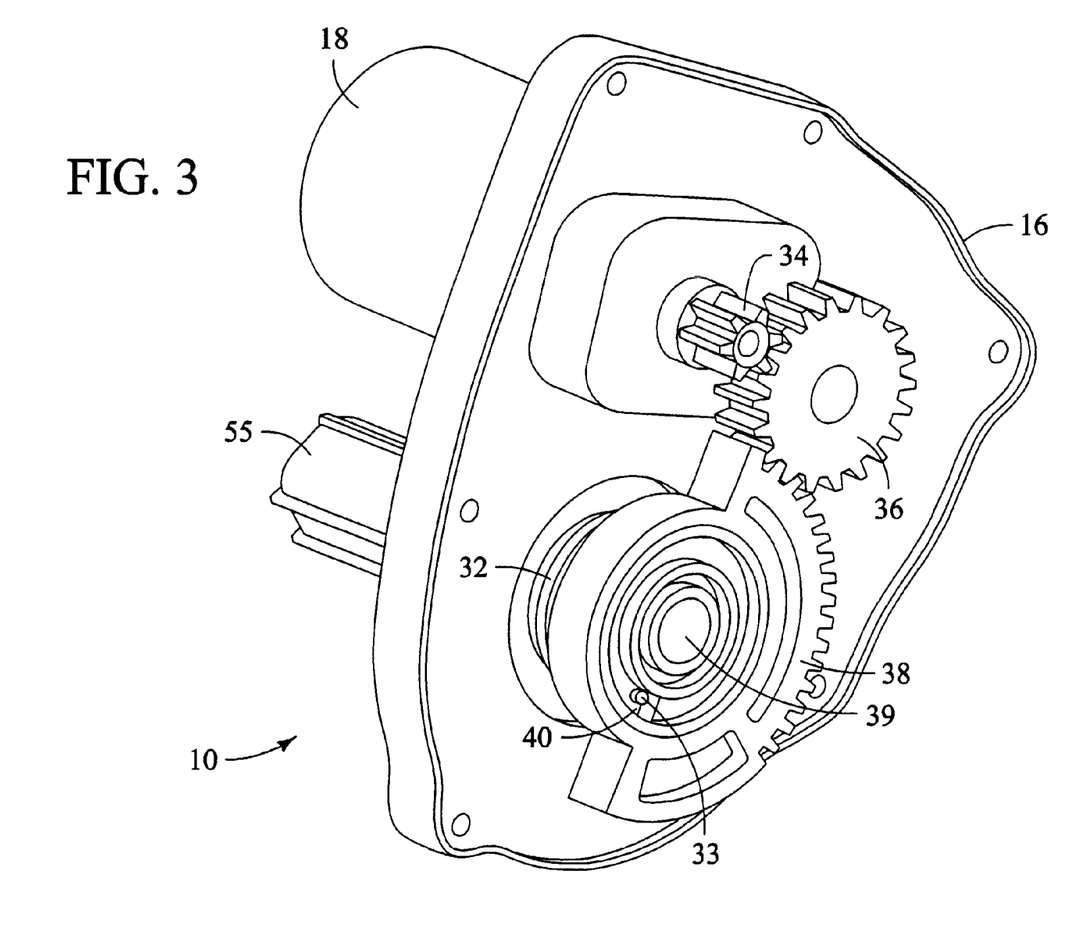
FIG. 3 is a perspective view of a motor cover incorporating a torsion spring assembly.

FIG. 3 depicts the side of the motor cover 16 facing the butterfly valve (as shown in FIG. 1), while the opposite side of the motor cover preferably includes the motor 18, pocket 20 and cap 22. Part of the torsion spring assembly is shown assembled onto the motor cover, including the spring 32. One tang or bent portion 33 of the spring is grounded into sector gear 38 through an aperture 40 in the sector gear. A drive train is also depicted including motor 18 with gear 34, such as a gear mounted to the armature of the motor, connected through cog 36 to sector gear 38. Alternatively, a splined shaft-armature will also work for the application. In use, when the motor turns through the drive train, sector gear 38 will turn, as will a shaft mounted in a central bore 39 in the gear, thus turning the shaft and butterfly valve depicted in FIG. 1. It is not necessary that any particular arrangement be used for this drive train, any suitable mechanism that can control the position and turning of a shaft and valve will suffice.

Figure 4:
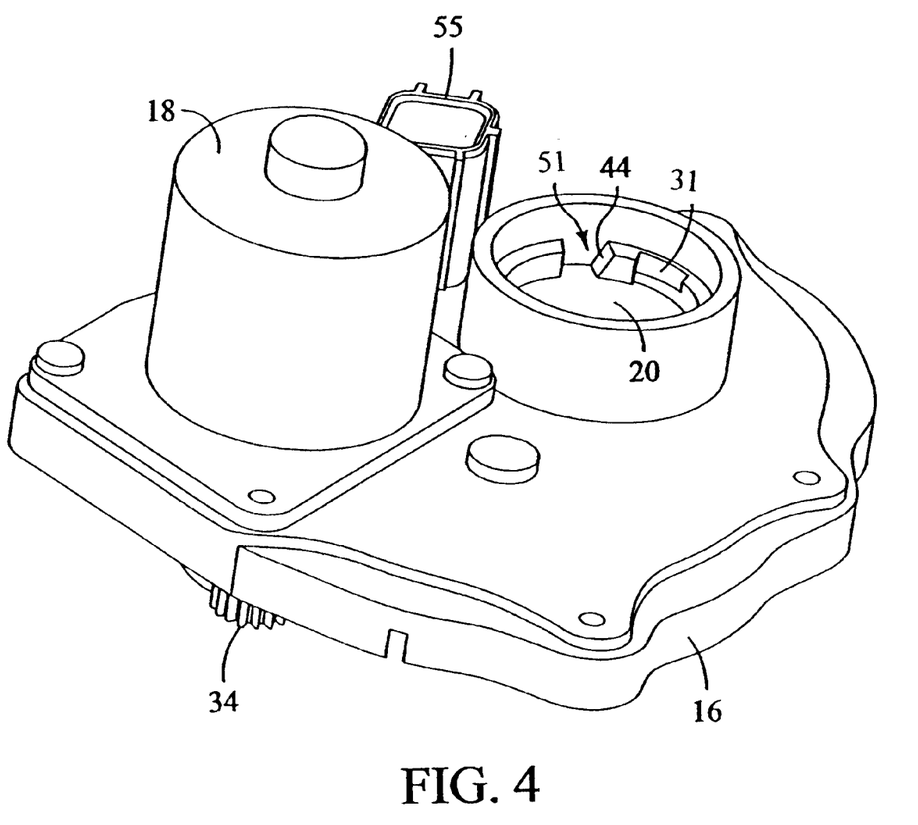
FIG. 4 is a perspective view of a motor cover assembly showing a pocket for receiving a torsion spring.
Figure 5:
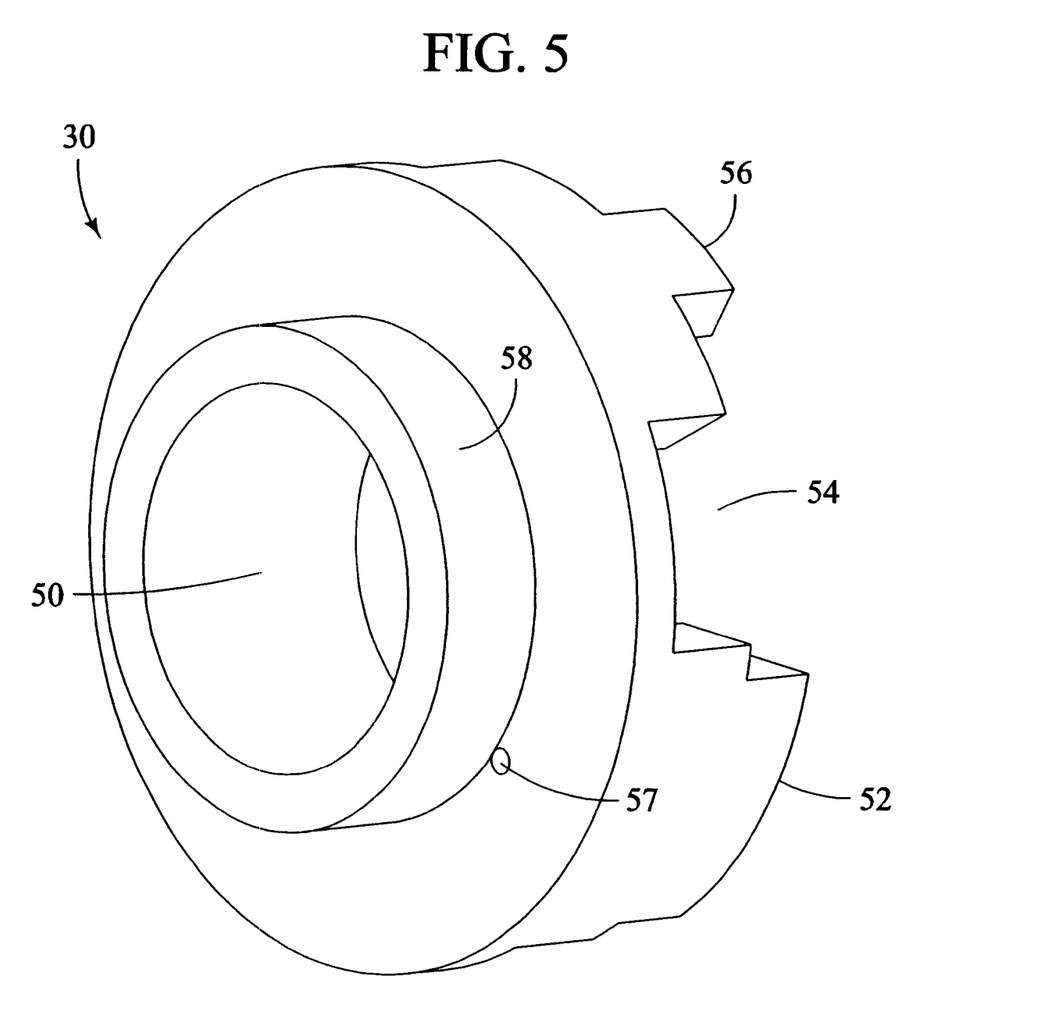
FIG. 5 is a perspective view of an insert for a torsion spring assembly.

FIG. 4 depicts the other side of the motor cover 16, facing toward the motor 18. Pocket 20 on this side is primarily designed to interface with and receive the insert and spring depicted above. The pocket is designed specially to mate with the insert and other parts of the torsion spring assembly. Visible in the drawing is slot 31 on the inner diameter of the pocket, and at least one angled contact surface on tab 44 and narrow slot 51. Gear 34 on the butterfly valve side is visible in this view. The insert to be installed will have tabs corresponding to the wide and narrow slots. Such an insert 30 is depicted in FIG. 5. The insert has a central bore 50 and a collar 58 for mounting the spring, and an aperture 57 for receiving a bent portion of tang of one end of the spring. The insert will have a wide tab 52, preferably at least two slots 54 at 90 degrees on the periphery and may have a narrow tab 56. The tabs correspond to the slots in the pocket, and when assembled, the tabs will fit into the slots of the pocket.

Figure 6:
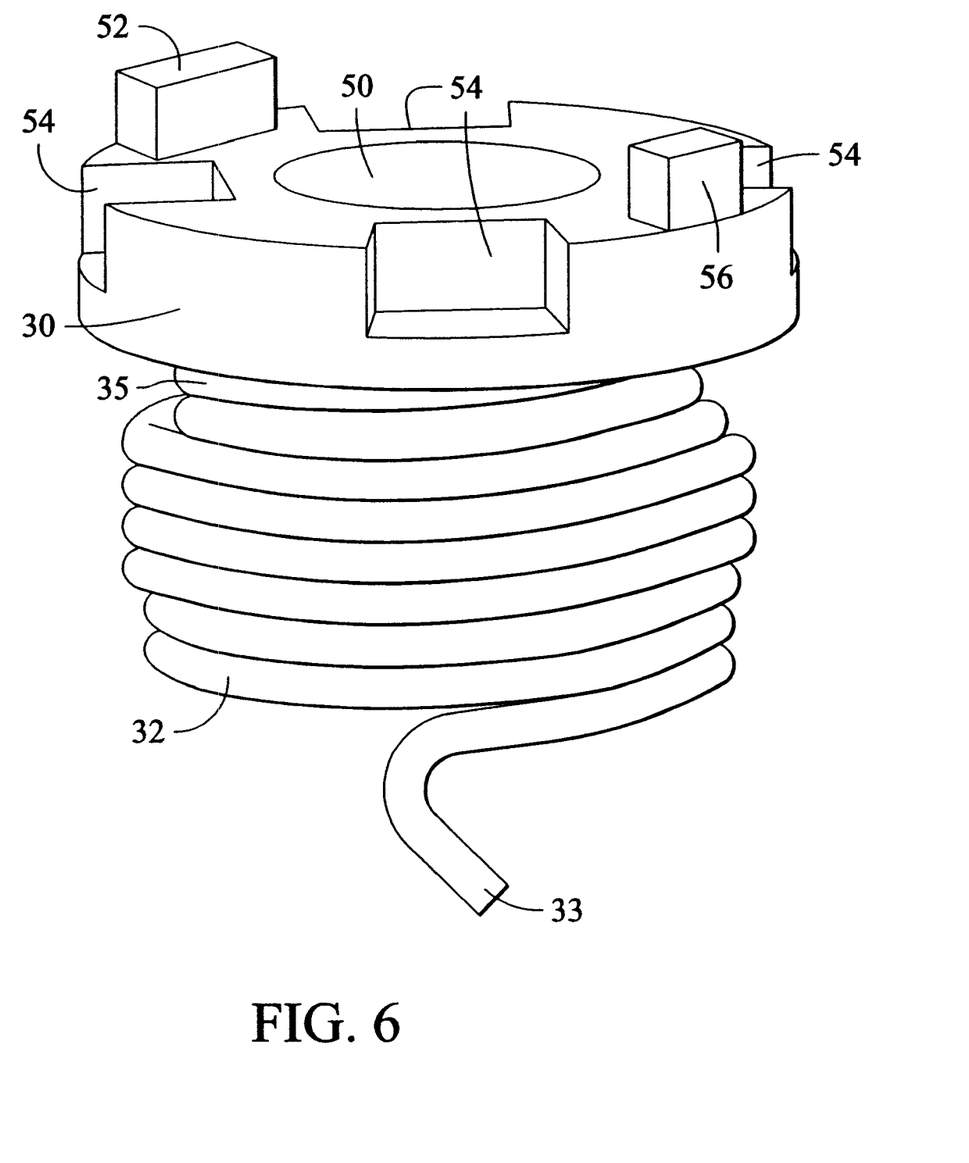
FIG. 6 is a view of an assembled torsion spring on an insert.
Figure 7:
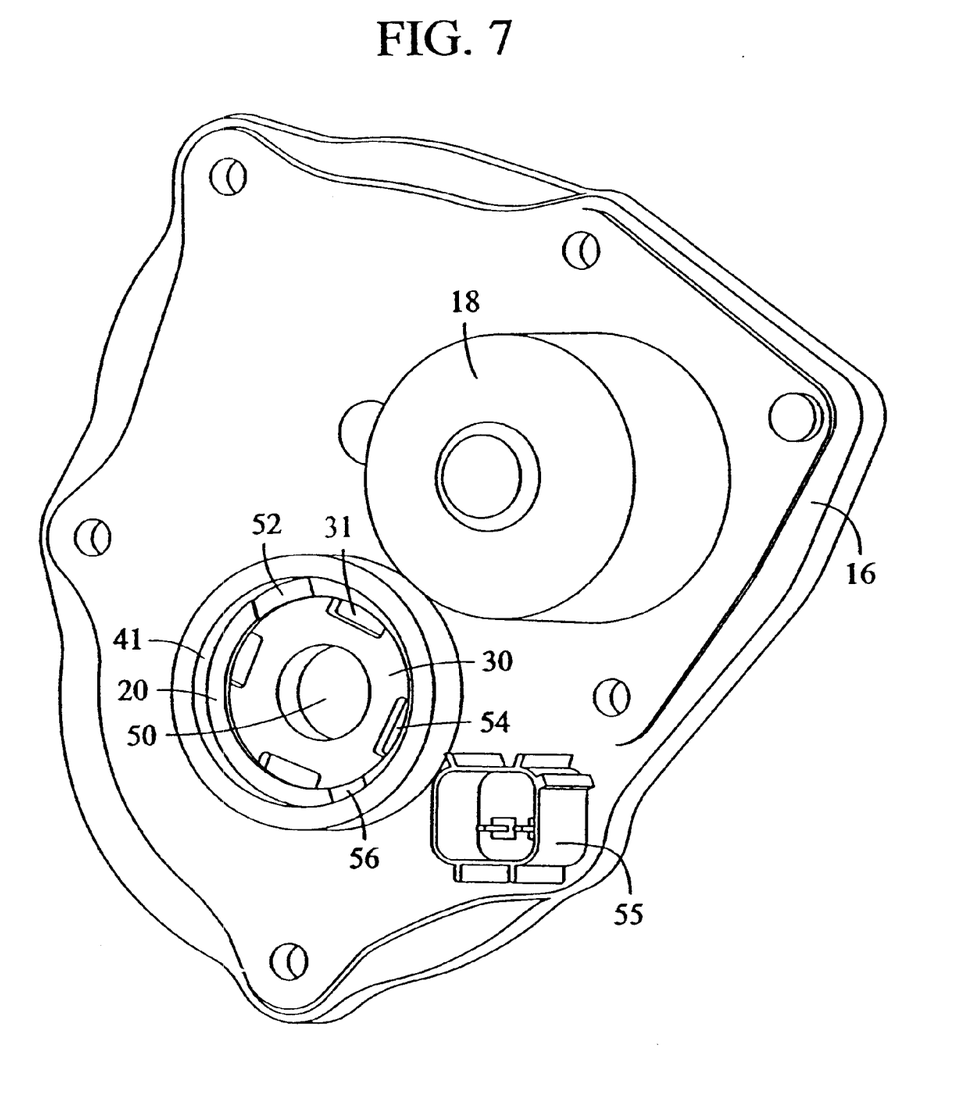
FIG. 7 is another view of a motor cover suitable for receiving a torsion spring assembly and insert.

An assembled insert 30 and spring 32 is shown in FIG. 6. One end of the spring mounts to the insert, with the other end of the spring free with tang 33 for later mounting to the gear train or sector gear. The spring may have one or more coils 35 of reduced diameter for mounting to the collar to the insert. This view also shows the wide tab 52 and narrow tab 56 on the face of the insert that will be assembled into the pocket of the motor cover, as well as slots 54 on the outer diameter of the insert and central bore 50. FIG. 7 gives a top view of the motor cover 16 with the motor 18 and with the spring and insert assembled to the motor cover. In this view, features of the pocket 20 and insert 30 are discernible, as well as their preferred spatial arrangement. Narrow tab 56 from the insert is seen to be at about a 205° angle from wide tab 52 of the insert, and the tabs are not necessarily on the same radius from central bore 50. The tabs fit into slots bored into the pocket of the motor cover. In addition, there are desirably four shallow slots 31 spaced evenly at about 90° around the housing. Slots 31 provide clearance for snap-fit features of a cap that covers and protects the torsion spring assembly. Lip 41 provides the undercut surface of the motor cover needed for snapping in and retaining the snap-fit features. The slots 31 are molded in as features in the housing, providing a relief for the top portions of the snap-sit fingers of the cap. These top portions do not allow the cap to rotate once assembled. Provision for connector 55 is also made in the motor cover. Connector 55 may be used for control or power signals to the motor 18.

Figure 8:
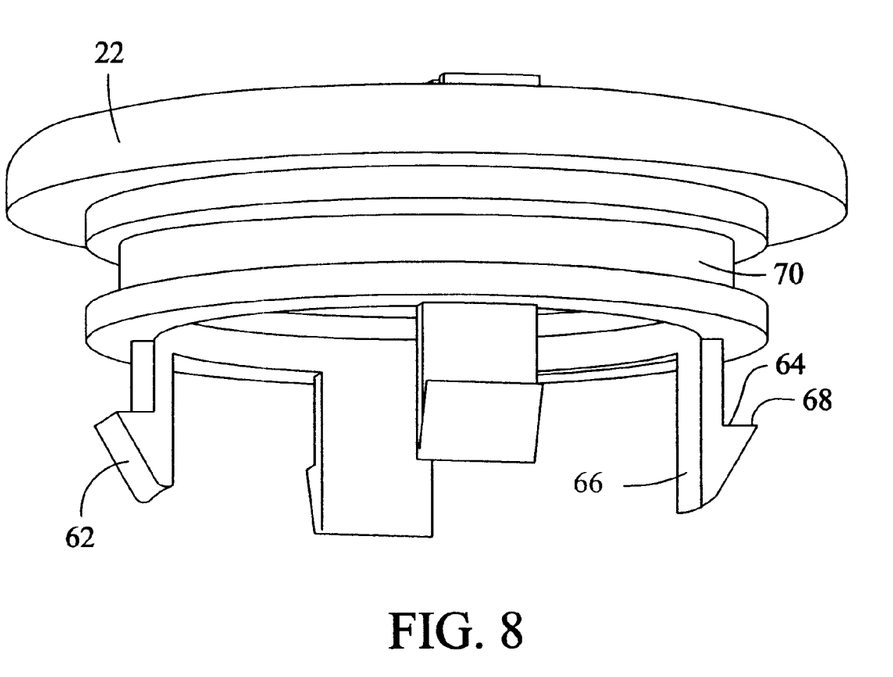
FIG. 8 is a view of a cap suitable for a torsion spring assembly.

FIG. 8 depicts the cap 22 used to protect the torsion spring assembly as part of an electronic throttle. The cap is designed to fit into the pocket and prevent dirt from interfering with the torsion spring function. The cap has one or more snap-fit features 62, preferably with approximately a right angle 64 between the arms 66 and the locking tab 68 of the snap fit feature. Having a right angle prevents disassembly of the cap once it has been assembled to the pocket of the motor cover, short of destructive disassembly. Other angles permitting disassembly may be used, but a right angle, and no ability to non-destructively disassemble, is preferred. A groove 70 for an O-ring to seal the cap may be provided.

Figure 9:
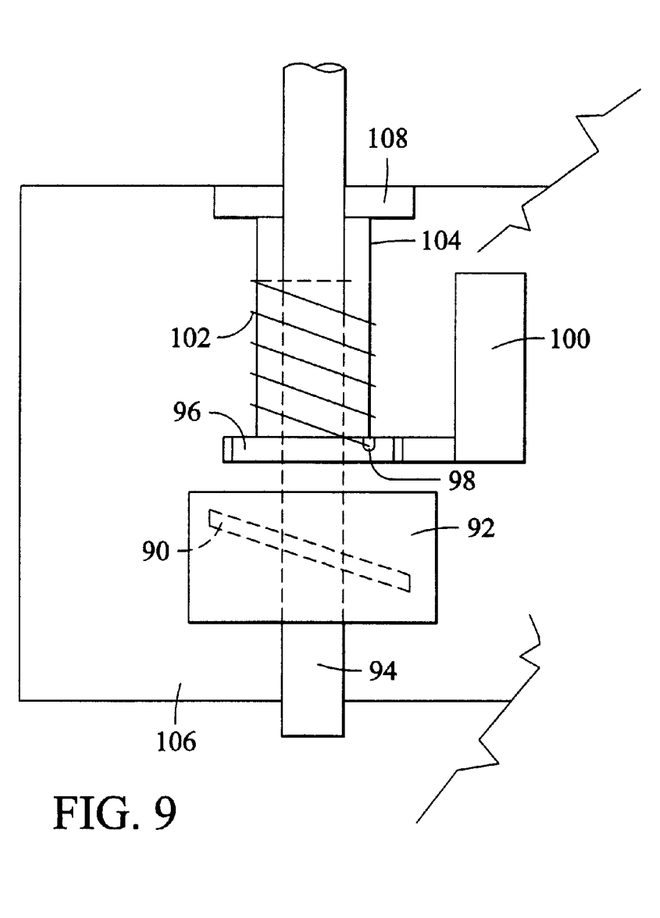
FIG. 9 is a view of a valve using a torsion spring assembly of the present invention.

FIG. 9 depicts a valve using the torsion spring assembly. The valve 90 has a valve body 92 and shaft 94, operably connected by a gear 96, wherein the shaft and gear have matching flats for easier rotation of the shaft. The gear also has an aperture 98 for connection of a torsion spring. The shaft is turned and the valve opened or closed by actuator 100. A torsion spring 102 is mounted on the shaft and one end is grounded in the aperture of the gear. An insert 104 is positioned inside the spring to center and support the coils of the springs, the spring grounded to the insert by an aperture (not shown) as previously shown. The insert is grounded to a pocket or a portion 108 of the actuator housing 106. When assembling the actuator, the assembler positions the several parts, the torsion spring, the insert designed so as to place the proper amount of torsion upon the spring. The shaft rotation and the valve housing restrict the movement of the spring.

Figure 10:
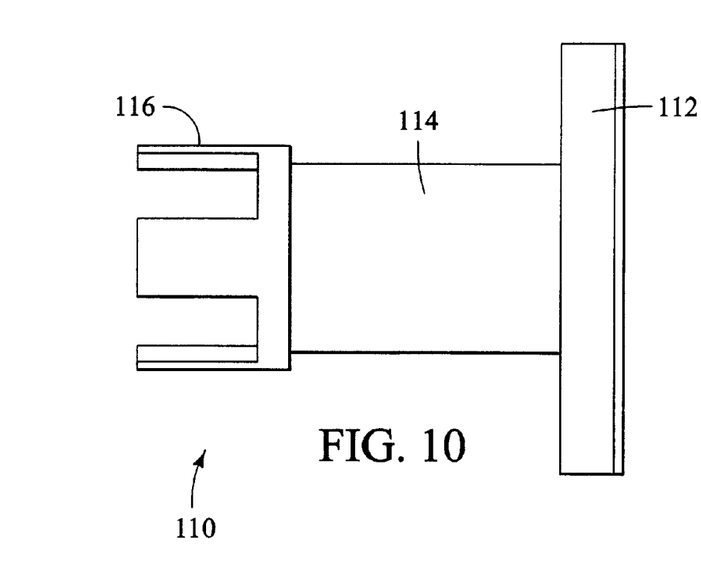
FIG. 10 is a winding tool suitable for a torsion spring assembly of the present invention.

FIG. 10 illustrates a winding tool 110 suitable for the present invention. The tool has a gripping surface 112, a standoff 114 and fingers 116 suitable for winding the insert a specified amount to reliably torsion the spring. The tool may be made of metal or sturdy plastic capable of torsioning the spring without deformation of the tool.

The spring is typically music wire of 12 to 26 ga., wound into a spring, and having a tang or bent portion on the first and the last coil, so that one end may be grounded to the motive force or gear providing motion to the throttle, and the other end to an insert. The insert is preferably molded plastic having a modulus of elasticity sufficiently high to resist deformation under load in the application, preferably about 1.0 million psi flexural modulus. Fiber-reinforced composite materials are excellent in this application, and preferred is a 33% glass-filled nylon 6/6, although other fiber loadings and other polymers will also perform adequately. The spring is assembled on one end of the insert and the tang from one end of the spring is inserted into an aperture of the insert. This grounds the spring to the insert, insuring that end of the spring will be fixed in position, so that when the opposite end of the coil is turned, the body of the spring is put into a state of torsion, that is, it will become coiled and will tend to resist further winding. The insert also acts to center the spring and support the coils of the spring so that they do not fold over on themselves, buckle, or encounter coil-to-coil rubbing. The cap is preferably made of fiber-reinforced composite, such as glass-filled nylon, and a 13% glass-filled nylon 6/6 material has been used satisfactorily. Materials having a flexural modulus of elasticity of about 0.5 million psi will work well, although material with a lesser modulus will also suffice. As mentioned above, once assembled and snap-fit into place, the cover, and thus the coil and insert, must not be free to rotate. This assures that the pre-load applied during assembly will remain, and that the spring will meet pre-load and performance requirements during normal operation of the electronic throttle and the motor vehicle into which it is assembled.

The insert is designed so that it supports the coil, as described above, and acts to control the degree of winding during assembly of the torsion spring assembly and the electronic throttle. The insert is preferably designed with a narrow tab and a wide tab so that it may be assembled in only one way, although other designs, with tabs of equal size, may also be used. The insert is also provided with slots for a winding tool, so that the when the insert and coil are assembled, the assembler must turn the winding tool a fixed amount of rotation every time for proper assembly. The slots also provide clearance for a cap.

To assemble one embodiment, the technician inserts the coil onto the insert, grounding the coil. The technician assembles the gear train, taking care to align the aperture in a first gear or gear sector in a desired orientation with respect to the feature of the pocket on the motor cover, and in such a manner that the gears do not rotate, and then assemble them into a throttle body housing to retain the spring and insert axially. The technician then uses a tool to rotate the insert and its captured spring approximately 205°, applying a torsional load to the spring. This rotation causes alignment of the narrow tab and wide tab of the insert with the narrow slot and wide slot of the motor cover pocket. In the unwound state, the spring exerts an axial force on the insert. When the narrow and wide tabs of the insert align with the slots in the motor cover, this axial force pushes the insert into place in the pocket, at which time the assembler may remove the winding tool. The cap is then snapped into place in the motor cover, locking in place with the snap-fit features of the cap. Other embodiments may use a greater or lesser angle in assembly, depending on the amount of torsion or bias desired.

In a more general sense, torsion springs are used to conserve energy, so that energy used to put a spring in a state of torsion is not completely lost when the spring reverts to its un-torsioned state. A very common use of a torsion spring assembly is in the very large springs used for garage-door openers. These large springs are placed into a state of torsion when the garage door is closed. The energy stored in the spring is subsequently used to help raise the door. The spring is re-torsioned when the door is closed. In a garage, the torsion spring is used to help open the door, whereas with an electronic throttle, the torsion spring is used to close the throttle. There are many other applications using torsion springs, including automotive door springs, surgical clamps, electrical circuit breakers, chime strikers, window shades, railroad gate crossing arms, automotive window regulators, thermal contactors, solar panel extenders, suspension assemblies, seal assemblies, and children's toys.

Of course, the particular advantage of the present invention will be best realized in small assemblies where economy and speed of assembly are important, and the size of the parts makes their assembly more difficult than very large springs, such as those used in garage doors or railroad gate crossing arms. The advantage of the present invention may also be more apparent in small movements, such as those wherein a flat spring, such as a Belleville washer, may be advantageous.

In additional to throttles, the advantages of the invention may be realized on any valve, especially those in which the sealing element or valve element is on a shaft, such as a butterfly valve, but also ball valves, gate valves, globe valves, and plug cocks.

One embodiment of the invention is used an electronic throttle in which a motor supplies the desired motion of the throttle in use, but other embodiments may use other actuators, such as pneumatic cylinders or hydraulic cylinders. While gears may provide the interface between the valve element and the moving force, other means besides gears may be used, such as levers, screws, pulleys, or other mechanical means suitable to moving a valve element.

There are also other ways to practice the invention. For example, the spring may have bent portions or tangs at each end, the tangs at 90° to the axis of the spring coils, or the tangs may extend axially. The end portions of the coils may have straight radial extensions (that is, at a tangent to the coil), or they may be special, hooked ends, or any other suitable method. What is important is that there is a means for holding the spring so that it may be put into a state of torsion. The end coils of the spring may be the same diameter as most of the other coils of the spring (the main body of the spring), or they may be of a reduced diameter, for easier placement onto the insert or for assembly.

While the torsion spring assembly has been described in terms of relatively high-performance materials such as fiber-reinforced nylons, other, less-expensive materials will work as well in applications requiring lesser force, or where the application of a torsion spring assembly is not as important as closing a throttle on an automobile. Thus, for applications to toys, games or amusements, inserts molded of polyethylene, polypropylene, or other, less-rigid, less-strong materials may well suffice. The electronic throttle application uses a gear to provide the movable radial location for one end of the throttle; in other applications, the movable radial location for the far end of the torsion spring may be a pivoting member (such as an arm of a doll), or a moving member (such as the grip on a window shade); or, in other applications, there may be two moving members, and the torsion spring assembly is merely meant to insure that the members move together (thermal contactor) or apart (unfolding and extending solar panels).

It is therefore intended that the foregoing description illustrates rather than limits this invention, and that it is the following claims, including all equivalents, which define this invention. Of course, it should be understood that a wide range of changes and modifications may be made to the embodiments and preferences described above. Accordingly, it is the intention of the applicants to protect all variations and modifications within the valid scope of the present invention. It is intended that the invention be defined by the following claims, including all of the equivalents thereto.

What is claimed is:

1. A method of moving a throttle to a closed position, comprising:

providing an electronic throttle, wherein the throttle is assembled with a single spring and an insert, the insert centering and supporting the spring, and wherein assembling the throttle winds the spring in torsion;

opening the throttle;

further winding the spring by said opening, wherein said opening rotates a gear, and the spring is held in torsion by the gear and by the insert; and closing the throttle by rotating the gear in the opposite direction.

2. The method of claim 1, wherein the insert and the spring rotate together, the structure of the insert enabling an assembler to put a desired amount of torsion on the spring during assembly.

3. The method of claim 1, wherein the insert fits inside the spring and one end of the insert has at least two slots and at least one tab, and another end of the insert has an aperture into which a bent portion of a coil of the spring fits.

4. The method of claim 1, wherein the closing is accomplished via the motor or the torsion of the compressed spring.

5. The method of claim 1, wherein the gear rotated is a sector gear.

6. A method of moving a throttle to a closed position, comprising:

providing a throttle, wherein the throttle is opened by rotating a gear connected to a shaft and a throttle plate, said throttle having a motor cover and a pocket defining a throttle opening;

providing an insert having a central bore, a collar at one end of the insert, and at least two slots and at least one tab at the other end of the insert;

winding a single spring in torsion by said rotating, wherein said rotating rotates a gear to wind the spring, and the spring is held in torsion by the gear and by said insert centering and supporting the spring in relation to a contoured annular contact surface inside the pocket of the motor cover; and closing the throttle by rotating the gear in the opposite direction by the torsion of the compressed spring.

7. The method of claim 6, wherein the gear is rotated by depressing an accelerator, and the gear rotates in the opposite direction by releasing the accelerator.

* * * * *